United States Patent Office 3,378,866
Patented Apr. 23, 1968

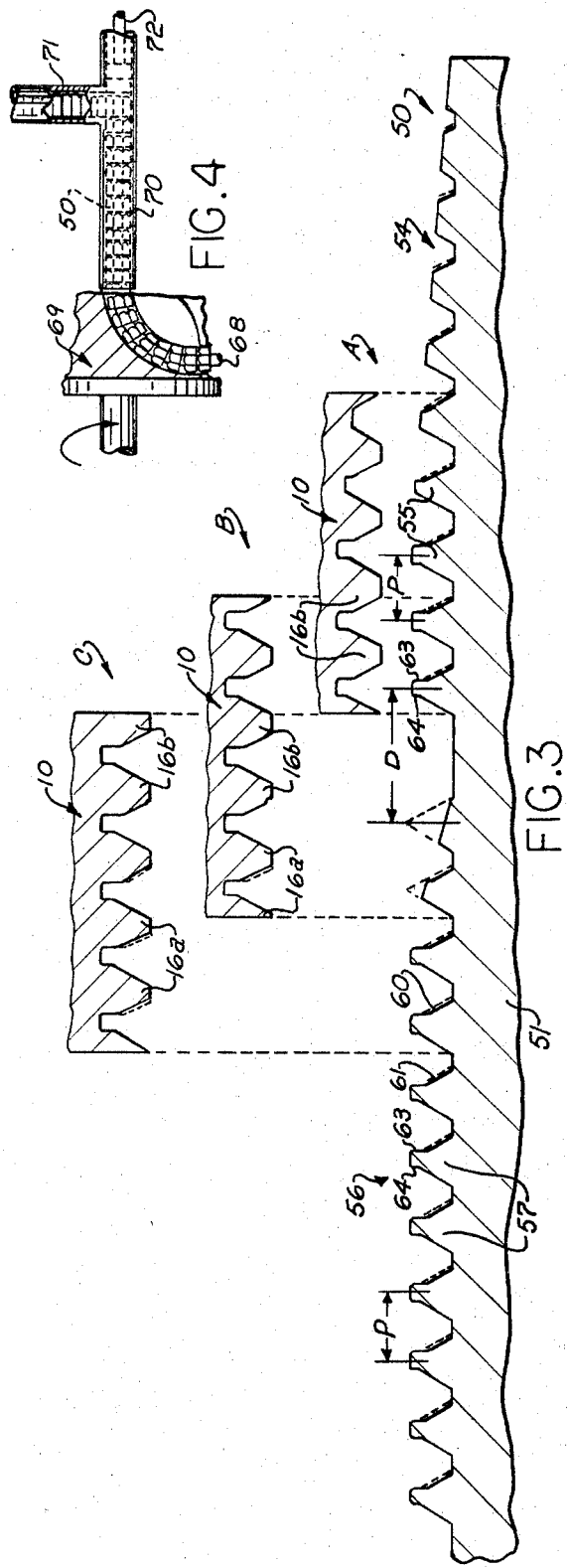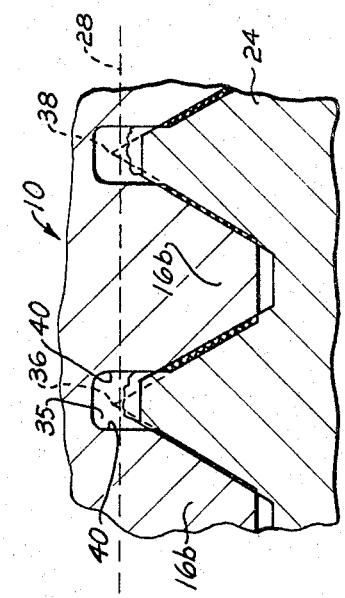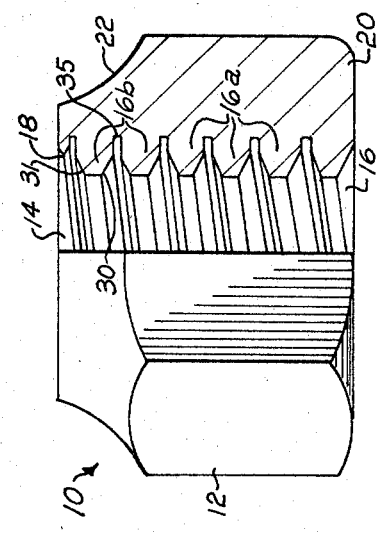
April 23, 1968  G. J. VAERNES  3,378,866
METHOD AND TAP FOR MAKING LOCK NUTS
Filed April 14, 1966
INVENTOR
GUNNAR J. VAERNES
BY Hoffmann and Yount
ATTORNEYS

3,378,866
METHOD AND TAP FOR MAKING LOCK NUTS
Gunnar J. Vaernes, Hinckley, Ohio, assignor to The Lamson & Sessions Co., Cleveland, Ohio, a corporation of Ohio
Filed Apr. 14, 1966, Ser. No. 542,577
19 Claims. (Cl. 10—86)

The present invention relates to a novel method and tap for producing an internal helical thread convolution having a nonlocking portion for freely engaging a mating external thread and a locking portion for interfering with the mating external thread along its flanks to provide a locking action therebetween, and in particular to a method and tap for producing a lock nut having such an internal thread convolution.

An object of the present invention is to provide a new and improved method and tap for producing an internal helical screw thread convolution of the character mentioned above on a side wall of a through opening in a metal body, such as a metal nut blank, by a continuous through tapping operation in which the metal body is received on the forward end of the tap and removed from the rearward end of the tap.

Another object of the present invention is to provide a new and improved method and tap for producing a continuous internal helical thread convolution of the character mentioned above on a side wall of a through opening in a metal body, such as a metal nut blank, and in which the metal body is received on one end of the tap and removed from the opposite end of the tap, and in which the tap has a leading section for cutting a given thread convolution and a following section for decreasing the flank width of the thread convolution formed by the leading section and with the tap being so arranged that the following section is effective to decrease the flank width for only a portion of the axial length of the thread convolution formed by the leading section and to freely pass through the remaining portion thereof.

Another object of the present invention is to provide a new and improved method and tap for producing an internal helical screw thread convolution of the character mentioned above and in which the side wall of a metal body, such as a metal nut blank, is first tapped by a leading tap section of the tap to provide a locking screw thread convolution therealong having a flank width which is greater than the maximum flank width for the standard thread of the same basic thread form and in which the leading tap section serves as a lead screw for a following tap section which is axially spaced from and out of pitch with respect to the leading tap section, and further tapping the locking thread convolution formed by the leading tap section with the following tap section to remove metal from one of the side flanks thereof to reduce the flank width to that of the standard thread until the metal body is disengaged from said leading tap section whereupon the latter no longer serves as a lead screw and the metal body and the following tap section shift axially relative to one another so that the remaining portion of the locking screw thread convolution formed by the leading tap section remains intact as it moves over the following tap section.

The present invention further provides a new and improved method and tap for producing such an internal helical screw thread convolution on a side wall of a through opening in a metal body, such as a nut blank, to provide a lock nut, and in which the locking portion of the thread convolution has a recess space formed between adjacent threads thereof which is larger in an axial plane than the triangle defined between adjacent side flanks thereof and preferably larger than the fundamental triangle of the theoretical basic thread form, and which preferably extends to a depth which is greater than the maximum major diameter for the standard thread of the same basic thread form. The recess space formed also preferably has a side wall means which extends generally radially of the axis of the thread convolution and which intersects one of the flanks of the locking thread convolution at a location located radially inwardly of the basic major diameter of the theoretical basic thread form.

Some of the advantages of the present invention are that locking fasteners, such as lock nuts, provided with such an internal thread convolution can be more rapidly and economically produced. Other objects, novel characteristics and advantages of this invention will be apparent in the following detailed description and in the accompanying drawings forming a part of this specification and in which like reference characters designate corresponding parts throughout the several views and in which:

FIG. 1 is a part elevational and part axial cross-sectional view of a lock nut made by the novel method and tap of the present invention;

FIG. 2 is an enlarged fragmentary axial sectional view of part of the lock nut shown in FIG. 1 and showing it applied to an externally threaded stem;

FIG. 3 is a combined fragmentary axial cross-sectional view of the preferred embodiment of the tap and a diagrammatic view showing a nut blank in axial cross section and the changes taking place in the thread convolution tapped in the nut blank by the tap as the nut blank moves from right to left relative to the tap; and FIG. 4 is a diagrammatic view of an apparatus which can be employed for carrying out the method of the present invention.

The present invention provides a novel method and tap for producing an internal helical screw thread convolution on a side wall of the through opening in a metal body by a continuous through tapping operation and in which the screw thread convolution has portions of different flank widths, preferably a nonlocking portion for freely engaging a mating or standard external thread and a locking portion forming a continuation of the nonlocking portion and which is adapted to interfere with the flanks of the mating or standard external thread to produce a locking action therebetween. Although the novel method and tap of the present invention could be employed for forming such an internal helical screw thread convolution in various kinds of members or fasteners, they are especially adapted for producing such a screw thread convolution on a side wall of an axial through opening of a nut blank to provide a lock nut of the thread flank interference type, and for the purposes of illustration are herein shown as being usable for making a lock nut from a nut blank.

As representing one embodiment of a lock nut which can be made in accordance with the novel method and tap of the present invention, the drawings show a lock nut 10. The lock nut 10 per se forms the subject matter of application, Ser. No. 527,965, filed Feb. 16, 1966, and assigned to the same assignee as the present invention and will only be described herein to the extent necessary for a clear understanding of the provisions of the present invention.

The lock nut 10 comprises a metal body 12 having an opening 14 extending axially therethrough and provided with a helical screw thread or screw thread convolution 16 on the side wall 18 of the opening 14. At one end thereof the body 12 has an annular bearing surface 20 in surrounding relation to the opening 14. The nut body 12 is preferably provided at its other end thereof with a radially and circumferentially resilient portion, which is here shown as being in the form of a collar portion 22 having a reduced transverse or radial dimension. The opening 14 extends entirely through the lock nut 10 and including the collar portion 22 thereof.

The helical screw thread or screw thread convolution 16 formed on the side wall 18 of the opening 14 has a nonlocking portion comprising a plurality of fully formed, free running screw thread convolutions 16a which are adapted to freely run on or engage the conventional standard screw thread on a threaded stem and a locking portion comprising a plurality of undistorted, non-standard locking thread convolutions 16b which are adapted to interfere with the mating standard threads on a stem 24 to produce a locking action therebetween. The thread convolutions 16a define a continuous free running, nonlocking thread portion which extends from or adjacent the end 20 along the opening 14 for a major portion of its length thereof and terminates adjacent the collar portion 22. The thread convolutions 16a, in the preferred embodiment, are standard thread convolutions of the theoretical basic form for the threads except that they have a major diameter which is greater than the maximum major diameter for the standard thread to facilitate manufacture of the nut 10. Also, tests have indicated that the provision of a major diameter which is greater than the maximum major diameter for a standard thread gives an improved fatigue life for the mating external thread as compared to the fatigue life of the mating external thread when a nut with standard threads is employed. The basic theoretical thread form or design for a screw thread is set forth in the National Bureau of Standards Hankbook H28 (1957) entitled Screw Thread Standards for Federal Services published by the United States Department of Commerce.

The locking portion of the screw thread convolution 16 comprises a plurality of screw thread convolutions 16b forming a continuation or extension of the thread convolutions 16a and extending along the remaining portion of the side wall 18 of the opening 14 and preferably for the full length of the collar portion 22. The locking thread convolutions 16b deviate from the standard thread convolutions of the theoretical basic form for the thread in that they have a pitch diameter which is less than the minimum pitch diameter of the standard thread convolutions of the basic thread form and preferably have a major diameter which is greater than the maximum major diameter for the standard thread convolutions of the basic form, the latter major diameter being indicated by the dotted line 28. The thread convolutions 16b are here shown as having planar leading and trailing side flanks 30 and 31, respectively, which have the same flank angle as the leading and trailing side flanks of the thread convolutions 16a and which have an axially extending flank width at any given radial location which is greater than the corresponding maximum flank width within established tolerance limits for the standard screw thread convolutions of the basic form for the thread. The screw thread convolutions 16a, 16b are here shown having a standard crest diameter.

The screw thread convolutions 16b forming the locking portion on the nut 10 interfere with a mating standard external thread on a stem 24 to produce a locking action therebetween and effect a swaging of metal when the nut is screwed onto the stem 24. Since the screw thread convolutions 16b have a pitch diameter which is less than the minimum pitch diameter of the standard screw thread convolution, the width of the groove between adjacent thread convolutions thereof is less than the width between the side flanks of the standard screw thread convolutions on the stem. Therefore, when the standard screw thread convolution on a stem engages the thread convolutions 16b on the nut, they interfere with each other, as indicated in FIG. 2 by the double cross hatched areas, to provide a locking action therebetween and cause metal to be swaged. Since the flank angle of the locking thread convolutions 16b is the same for the standard thread convolutions locking threads have a uniform depth of interference along the thread flanks.

The major portion of the metal swaged from the side flanks of the thread convolutions 16b is adapted to be received within recesses 35 formed between the adjacent thread convolutions 16b. The recesses 35, in the preferred embodiment, are larger in an axial plane than the recess spaced defined by the triangle between the adjacent threads 16b, i.e., the triangle whose sides are coplanar with the flanks 30, 31 and whose apex is the projected point of intersection of the flanks, as indicated by reference numeral 36 and preferably larger than that defined by the fundamental triangle of the basic thread form. The recesses 35, in the preferred embodiment, extend radially outwardly to a depth which is greater than the depth defined by the maximum major diameter for the standard thread of the same basic thread form and preferably to a depth greater than the sharp root of the basic thread form, as indicated by reference numeral 38. The recesses 35 preferably have side wall portions 40 which extend generally radially outwardly of the axis of the nut and which intersect the leading and trailing flanks of the threads 16b preferably at a location radially inwardly of the basic major diameter of the basic thread form or radially inwardly of the crests of the standard thread on a stem. From the foregoing, it should be apparent that the recess space provided between adjacent threads 16b is sufficient to freely accommodate any or all metal which is swaged thereinto as a result of the thread interference between the locking portion and the threads on the stem without any galling or seizure between the nut and stem taking place.

In accordance with the provisions of the present invention, a novel method and tap are provided for forming the screw thread convolution 16 on the side wall of an axial through opening in a nut blank by a continuous through tapping operation in which the nut blanks are received on the forward end of the tap and removed from the rearward end thereof. Referring to FIG. 3 of the drawings, a preferred embodiment of a tap 50 for forming the screw thread convolution 16 is there shown. The tap 50 comprises a tap body 51 having a plurality of circumferentially spaced lands and flutes. The tap body 51 comprises a leading or forward tap section 54 having a first plurality of helically extending cutting teeth 55 formed on each of the lands and axially spaced following or rearward tap section 56 having a second plurality of helically extending cutting teeth 57 formed on each of the lands. The leading and following tap sections 54 and 56, respectively, preferably are chamfered along their forward or right end portions, as viewed in FIG. 3.

The cutting teeth 55 and 57 have the same helix angle with respect to the axis of a tap body 51 and, in the preferred embodiment, have an identical profile, as viewed in an axial cross section. The cutting teeth 55 and 57 are here shown as being undercut to a uniform depth along a substantial portion of their leading flanks 60, as indicated by the difference between the solid and dotted lines of the cutting teeth on the tap 50 and designated by reference numeral 61. The undercut portion 61 of the flanks 60, in the embodiment shown, extends from the minor diameter of the cutting teeth to a location spaced radially inwardly from the crest diameter of the fully formed cutting teeth. The cutting teeth 55 and 57 are here shown as also having leading and trailing flank portions 63 and 64, respectively, which extend generally radially of the axis of the tap body. The flank portions 63 and 64 extend radially inwardly from the crests of the cutting teeth and are angularly related to and intersect the remaining portion of the leading and trailing flanks. The cutting teeth 55 and 57 on the first and second sections 54 and 56, respectively, have the same pitch between adjacent teeth thereof, as designated by reference numeral P, and have a pitch diameter which is less than the pitch diameter for the cutting teeth on a tap for cutting the standard thread of the same theoretical basic thread form. The cutting teeth 55 and 57, in the preferred embodiment, have a standard minor diameter and a crest diameter which is greater than the maximum crest diameter for the cutting teeth on a tap for cutting the standard thread of the same theoretical basic thread form.

The following section 56 of a tap is axially spaced from the leading tap section 54 so that the cutting teeth 57 thereof are out of pitch with respect to the cutting teeth 55 on the leading section 54. That is, the distance D as measured parallel to the axis of the tap body 51 from a point on the last cutting tooth on the leading section 54 to the corresponding point on the first tooth 57 of the following section varies slightly from a multiple of the pitch P between adjacent teeth on either of the leading or following sections 54 and 56 and preferably is slightly less than a multiple of the pitch P. In the preferred embodiment, the distance D between the last cutting tooth on the leading section 54 and the corresponding point on the first cutting tooth on the following tap section 56 is slightly less than twice the pitch P between adjacent teeth on the leading tap section. The extent to which this distance varies from twice the pitch or 2P is preferably equal to the depth of the undercut 61 as measured parallel to the axis of the tap body, the depth of the undercut 61 being indicated by the difference between the dotted and solid lines of the cutting teeth on the tap 50. It will of course be understood that the trailing flanks of the cutting teeth 55 and 57 on the first and second sections 54 and 56, respectively, could be undercut rather than the leading flanks, but in such a case the distance D would be slightly greater than the multiple of the pitch P.

The tap 50 can be used in any suitable or conventional through or continuous tapping machine, such as the type shown diagrammatically in FIG. 4, in which the tap 50 has a rearward bent shank portion 68 which is received within a rotatable collar means 69 of the machine. The tap 50 is rotated about the axis of its straight portion while the latter is concentrically disposed within a stationary sleeve 70 which is adapted to slidably receive and hold the nut blanks against rotation. The nut blanks are fed through a chute 71 by gravity into the sleeve 70 and onto the forward end of the straight portion of the tap by an injector mechanism 72 with the nuts already on the tap supporting the tap concentrically in the sleeve 70. The nut blanks are advanced axially of the tap 50 by rotating the latter relative to the sleeve and are removed from the bent shank 68 of the tap by being pushed therealong by the newly tapped nut blanks.

To make the lock nut 10, a preformed nut blank having an axial through opening can be fed onto the tap 50 in a direction from right to left, as viewed in FIG. 3 while the nut blank is held against rotation and the tap is being rotated relative to the nut blank. The leading section 54 of the tap forms a locking screw thread convolution on the side wall 18 of the nut 10 like the screw thread convolutions 16b and advances the nut, which is held against rotation, axially relative to the tap 50 toward the following tap section 56, as indicated at A in FIG. 3. The leading section 54 of the tap 50 serves as a lead screw for leading the nut blank onto the following section 56 of the tap. That is, the leading section 54 of the tap holds the nut blank, as it is being moved onto the following section, to prevent relative axial shifting movement therebetween other than the relative axial movement caused by the advancement of the nut along the tap 50 due to the cutting of the threads 16b.

As the nut is advanced onto the following section 56 of the tap 50, as indicated at B in FIG. 3, metal is removed from the leading flank of the locking thread convolution formed by the leading tap section to reduce the flank width of the thread convolution to that of a standard thread to form the thread convolutions 16a, the reduction of the flank width being indicated by the difference between the solid and dotted lines on the thread convolutions 16a. Since the cutting teeth on the following section 56 are slightly out of pitch with respect to the cutting teeth on the leading tap section 54, the locking thread convolution 16b as it is moved onto the following section will have its trailing flank slightly axially spaced from the trailing flank of the cutting teeth 56 and with its leading flank overlapping the adjacent leading flank of the cutting teeth 56 so that metal is removed therefrom.

The removal of metal from the leading flanks of the locking thread convolution 16b, which have been formed by the leading tap section, takes place until the nut blank disengages the leading section of the tap, as indicated at C in FIG. 3, whereupon the leading section 54 of the tap 50 no longer provides a lead screw action. When this occurs, the nut blank and the following section of the tap shift axially relative to one another so that the cutting teeth 57 on the following section 56, which corresponds in shape to the recess between the locking threads 16b, will pass freely through the remaining portion of the locking thread convolution formed by the leading tap section 54 and no longer remove metal from the leading flank. Continued rotation of the tap 50 relative to the nut causes the nut to move rearwardly and pass over the shank of the tap.

It should be apparent from the foregoing that by varying the axial spacing between the leading and following tap sections of the tap, the length of the locking portion of the screw thread 16 formed on the side wall of the nut body can be varied. It should also be apparent that the recess space formed between adjacent threads and especially the configuration at the bottom of the thread and the depth thereof can be varied by suitably forming the cutting teeth adjacent their crests to a shape corresponding to the shape of the recess desired.

From the foregoing it can be seen that a novel and economical method and tap have been provided for producing an internal helical screw thread convolution having portions of different flank widths, and preferably a nonlocking portion for freely engaging a mating or standard external thread and a locking portion for interfering with the mating or standard external thread along its flanks to provide a locking action therebetween by a continuous through tapping operation. It can also be seen that a novel and economical method and tap for making a lock nut having such an internal screw thread convolution to form a preformed nut blank having an axial through opening therethrough by a continuous through tapping operation with a single tap has been provided.

While the preferred embodiment of the present invention has been described in considerable detail, it will be apparent that the invention is not limited to the construction shown and that it is my intention to cover hereby all adaptations, modifications and changes therein which come within the practice of those skilled in the art to which the invention relates and the scope of the appended claims.

Having described my invention, I claim:

1. A method for producing an internal helical thread convolution having portions of different flank widths on a side wall of a through opening in a metal body comprising the steps of tapping the side wall of said opening in said metal body with a leading section of a tap by relatively rotating said tap and said metal body to form a screw thread convolution having a given flank width and utilizing said leading tap section as a lead screw for leading said metal body onto an axially spaced following tap section, tapping said thread convolution formed by said leading tap section with said following tap section to decrease the flank width thereof until said metal body disengages said leading tap section whereupon said leading tap section no longer provides a lead screw action and said following tap section and said metal body shift axially relative to each other so that the following tap section no longer decreases the flank width of the remaining portion of the thread convolution formed by said leading tap section, and continuing said relative rotation between said tap and metal body with said remaining portion of the thread convolution passing freely over the following section of the tap.

2. A method, as defined in claim 1, and wherein the following tap section has cutting teeth which are axially spaced from the last cutting tooth in said leading tap section so as to be out of pitch therewith.

3. A method for producing an internal helical thread convolution on a side wall of a through opening in a metal body and having a nonlocking portion for freely engaging a mating or standard external thread and a locking portion forming a continuation of said nonlocking portion for interfering with the mating or standard external thread comprising the steps of: tapping the side wall of said opening in said metal body with a leading section of a tap by relatively rotating said tap and said metal body to form a locking screw thread convolution having a flank width which is greater than the maximum flank width for a standard screw thread convolution of the same theoretical basic thread form and utilizing said first tap section as a lead screw for leading said metal body onto a following tap section axially spaced from said leading section so that it is out of pitch with respect to said leading tap section so that its cutting teeth will overlap one of the flanks of the locking thread convolution and be axially spaced from the other of the flanks of the locking thread convolution, tapping said locking thread convolution formed by said leading tap section with said following tap section to provide said nonlocking portion by removing metal from said one flank of said locking screw thread convolution to reduce the flank width thereof to that of a standard thread until said metal body disengages said leading tap section whereupon said leading tap section no longer provides a lead screw action and said tap and metal body shift axially relative to each other so that the cutting teeth on said following tap section no longer overlap said one flank and remove metal from the remaining locking portion of the locking thread convolution formed by said leading tap section, containing said relative rotation between said tap and metal body with the remaining locking portion passing freely over and clearing the following section of the tap.

4. A method of making a lock nut having an axial opening therethrough provided with a helical screw thread convolution along its side wall comprising a nonlocking portion for freely engaging a standard external thread on a threaded stem and a locking portion forming a continuation of said nonlocking portion for interfering with the standard threads on a stem from a preformed metal nut blank having an axially extending opening therethrough comprising the steps of: tapping the side wall of said opening in said nut blank with a leading section on a tap by relatively rotating said tap and said nut blank to form a locking screw thread convolution having a flank width which is greater than the maximum flank width for a standard screw thread convolution of the same theoretical basic thread form and utilizing said first tap section as a lead screw for leading said nut blank onto a following tap section axially spaced from said leading section so that it is out of pitch with respect to said leading tap section so that its cutting teeth will overlap one of the flanks of the locking thread convolution and be axially spaced from the other of the flanks of the locking thread convolution, tapping said locking screw thread convolution formed by said leading tap section with said following section to provide said nonlocking portion by removing metal from said one flank of said locking screw thread convolution to reduce the flank width of the locking thread convolution to that of a standard thread until said nut blank disengages said first tap section whereupon said leading tap section no longer provides a lead screw action and said tap and nut blank shift axially relative to each other so that the cutting teeth on said following tap section no longer overlap said one flank and remove metal from the remaining locking portion of the locking thread convolution formed by said leading tap section, continuing said relative rotation between said tap and nut blank with said remaining locking portion passing freely over and clearing the following section of the tap.

5. A method of making a lock nut, as defined in claim 4, and wherein the following section of the tap is axially spaced from the leading section so that the distance from a point on the last cutting tooth on the leading section to the corresponding point on the first tooth on the following section is slightly greater than a multiple of the pitch between adjacent teeth on said leading section.

6. A method of making a lock nut, as defined in claim 4, and wherein said tap forms a recess between adjacent threads of said locking thread convolution having a side wall means which extends generally radially with respect to the axis of the thread convolution and which intersects the flank of the locking thread convolution at a location located radially inwardly of the basic major diameter of the theoretical basic form of the thread.

7. A method of making a lock nut, as defined in claim 6, wherein the thread convolution has a major diameter which is greater than the maximum major diameter with established tolerance limitations for a standard thread of the same basic thread form.

8. A method of making a lock nut, as defined in claim 4, wherein said leading tap section forms a recess space between adjacent threads of the locking thread convolutions which is larger in axial plane than the triangle defined by the adjacent flanks of the locking thread convolution.

9. A method of making a lock nut, as defined in claim 4, and wherein said leading tap section forms a recess space between the adjacent threads of the locking thread convolution which is larger in an axial plane than the recess space defined by the fundamental triangle of the theoretical basic thread form.

10. A method of making a lock nut, as defined in claim 4 and wherein the following section of the tap is axially spaced from the leading section so that the distance from a point on the last cutting tooth on the leading section to the corresponding point on the first tooth on the following section is slightly greater than a multiple of the pitch between adjacent teeth on said leading section.

11. A tap for producing an internal helical screw thread convolution having first and second portions of different flank widths on the side wall of a through opening in a metal body comprising: a tap body having leading and following tap sections and a forward end for receiving the metal body and a rearward end for removal of the metal body, first thread cutting means on said leading tap section for cutting a helical thread convolution on the side wall of said opening having a given flank width, second thread cutting means on said following tap section which is effective to remove metal from one of the flanks of the screw thread convolution formed by the leading tap section for a portion of the axial length thereof to decrease the flank width thereof to form said first portion and to pass freely through the remaining portion of said thread convolution formed by said leading section.

12. A tap, as defined in claim 11, and wherein said second thread cutting means are axially spaced from said first thread cutting means so as to be out of pitch with respect to the first thread cutting means.

13. A tap for use in tapping the side wall of a through opening in a metal body by a through tapping operation to provide a helical screw thread convolution comprising: a tap body having a leading tap section and a following tap section axially spaced from said leading section, said first and second plurality of cutting teeth having a pitch diameter which is less than the pitch diameter of the cutting teeth of a tap for cutting a standard internal thread of the same theoretical basic thread form, said leading section of said tap when used to tap said metal body providing a locking screw thread convolution on the side wall thereof which has wider flanks than a standard screw thread convolution of the same theoretical basic form and providing a lead screw action as said locking screw thread convolution formed thereby is led onto said following section, said following section of said tap being axially spaced from said leading tap section so that its cutting teeth are out of pitch with respect to the cutting teeth of said leading section so that said second plurality of cutting teeth will be axially spaced from one of the flanks of the locking thread convolution to reduce the flank width thereof to that of a standard thread until said leading section is disengaged from said metal body whereupon said leading section no longer provides a lead screw action and said tap and said metal body shift axially relative to each other so that the remaining portion of the locking screw thread convolution formed by the leading tap section will pass freely over said second section of the tap and remain intact.

14. A tap, as defined in claim 13, wherein the pitch between adjacent cutting teeth of said leading tap section is the same as the pitch between adjacent cutting teeth on said following tap section, and wherein said following tap section is axially spaced from said leading tap section so that the distance as measured from a point on the last cutting tooth of said leading tap section to the corresponding point on the first cutting tooth of said following tap section and parallel to the axis of the tap is slightly greater than a multiple of the pitch between adjacent teeth of said leading tap section.

15. A tap, as defined in claim 13, wherein the crest diameter of said first plurality of cutting teeth is greater than the maximum crest diameter for the cutting teeth of a tap for cutting a standard thread to provide a recess space between adjacent threads of the thread convolution which extends to a depth which is greater than the maximum major diameter for the standard thread of the same theoretical basic thread form.

16. A tap, as defined in claim 13, and wherein said cutting teeth on said leading tap section have a flank portion adjacent their crests which extends generally radially of the axis of the tap to provide a recess between adjacent thread of said locking thread convolution which has a side wall portion which extends generally radially of the axis of the thread convolution and which intersects the flank of the locking thread convolution.

17. A tap, as defined in claim 14, and wherein said first plurality of cutting teeth on said leading tap section are undercut along their leading flanks, as viewed in axial cross section, and having a crest diameter which is greater than the maximum crest diameter for the cutting teeth of a tap for cutting a standard thread to provide a recess space between adjacent threads on the locking thread convolution which extends radially outwardly of the maximum major diameter for a standard thread on the same theoretical basic thread.

18. A tap, as defined in claim 17, and wherein said cutting teeth on said leading and following tap sections have an identical profile as viewed in axial cross section.

19. A tap, as defined in claim 13, wherein the pitch between adjacent cutting teeth of said leading tap section is the same as the pitch between adjacent cutting teeth on said following tap section, and wherein said following tap section is axially spaced from said leading tap section so that the distance as measured from a point on the last cutting tooth of said leading tap section to the corresponding point on the first cutting tooth of said following tap section and parallel to the axis of the tap is slightly greater than a multiple of the pitch between adjacent teeth of said leading tap section.

References Cited
UNITED STATES PATENTS 1,174,294    3/1916    Sharp _____ 10—86

FOREIGN PATENTS 105,832    11/1938    Australia.

LEONIDAS VLACHOS, *Primary Examiner.*

UNITED STATES PATENT OFFICE
CERTIFICATE OF CORRECTION

Patent No. 3,378,866                                    April 23, 1968

Gunnar J. Vaernes

It is certified that error appears in the above identified patent and that said Letters Patent are hereby corrected as shown below:

Column 7, line 37, "containing" should read -- continuing --.

Signed and sealed this 14th day of October 1969.

(SEAL)
Attest:

Edward M. Fletcher, Jr.                      WILLIAM E. SCHUYLER, JR.
Attesting Officer                             Commissioner of Patents